United States Patent [19]
Baumeister

[11] Patent Number: 6,092,704
[45] Date of Patent: *Jul. 25, 2000

[54] BAG AND ACCESSORY HANDLING SYSTEM

[76] Inventor: Joseph A. Baumeister, 10051 Barberton, Crestwood, Mo. 63126

[ * ] Notice: This patent issued on a continued prosecution application filed under 37 CFR 1.53(d), and is subject to the twenty year patent term provisions of 35 U.S.C. 154(a)(2).

[21] Appl. No.: 08/784,252

[22] Filed: Jan. 15, 1997

Related U.S. Application Data

[60] Provisional application No. 60/009,827, Jan. 16, 1996.

[51] Int. Cl.$^7$ ........................................................ B60R 7/04
[52] U.S. Cl. .......................... 224/275; 224/311; 224/553; 224/925
[58] Field of Search ..................................... 224/275, 311, 224/925, 309, 313, 314, 553, 555, 560, 567

[56] References Cited

U.S. PATENT DOCUMENTS

| | | | |
|---|---|---|---|
| 3,986,649 | 10/1976 | Heimstra | 224/275 X |
| 4,671,556 | 6/1987 | Lynas, III | 224/313 X |
| 5,137,158 | 8/1992 | Brockway | 224/403 X |
| 5,287,971 | 2/1994 | Dorman | 224/925 |
| 5,415,457 | 5/1995 | Kifer | 224/543 X |
| 5,484,091 | 1/1996 | Malinowski et al. | 224/925 |
| 5,492,257 | 2/1996 | Demick | 224/275 |
| 5,716,091 | 2/1998 | Wieczorek | 224/275 X |

FOREIGN PATENT DOCUMENTS

| 1148425 | 12/1957 | France | 224/275 |
|---|---|---|---|

*Primary Examiner*—Renee Luebke
*Attorney, Agent, or Firm*—Paul M. Denk

[57] ABSTRACT

A bag or other item handling system including support struts that connect either to the interior of a vehicle trunk lid, or to the back of preferably a rear seat, for securement of support arms, which include integral hooks, and to which handled bags may be secured during transit of a vehicle. A modification provides the connection of a molded base or platform, having formed cavities therein, and to which accessory items may locate, be strapped or otherwise fastened in place, for storage when not in use. When system is applied to the back of a rear seat of a vehicle, a fastening bar may secure to the seat, at various elevated locations, interconnect pivotal hinge assemblies thereto, for supporting the support struts and support arms in place, for temporarily holding merchandise laden bags or other items in place, during transit or storage. The bag handling system of this invention can also be fabricated for use in conjunction with suspension hooks, for suspending over the upper edge of the back seat of a vehicle or van, or more permanent types of fasteners may be used for securement of the system directly to the internal structure of the back seat, for more permanent installation. In addition, the bag handling system may be made to narrowing widths, and suspended over a seat back of a single width seat, or the system may be permanently installed thereto, through supporting structure. In addition, the support arms of this invention may be affixed permanently to the interior of the trunk lid of the vehicle, for convenient usage in that manner.

9 Claims, 10 Drawing Sheets

BAG AND ACCESSORY HANDLING SYSTEM

This application claims benefit of Provisional application Ser. No. 60/009,827 filed Jan. 16, 1996.

BACKGROUND OF THE INVENTION

This invention relates generally to a bag handling system, and more specifically one that is fabricated for installation in combination with certain components of vehicles, so as to quickly provide means for support of the variety of grocery bags that are assembled by the usual shopper after extensively shopping at the grocery store or the like, and provide convenient means for fixing the bags at an upright location and conveniently within the grasp of the shopper/driver to ease the transfer of the groceries, or the like, during transit, and facilitate their removal for cartage into the home.

As any shopper knows, when particularly undertaking the weekly or semi-weekly trip to the supermarket or grocery store, or while shopping for gifts, or the like, and when a large quantity of goods are purchased, usually many bags of groceries are obtained, need to be transferred to the automobile or vehicle after purchase, and then driven to the home. It is not too unlikely that frequently as many as a dozen bags of merchandise may be obtained, and transferred during one shopping visit.

As has become very common place in the market, frequently, particularly when grocery shopping, the smaller plastic style of bag, with handles at its upper edge, is used to temporarily package the purchased groceries and this is the reason why a large number of such bags are encountered, during an extensive shopping trip. While such bags are very convenient for carrying, because their handles are readily accessible and a plurality of bags can be gripped for carrying, once the shopper reaches his/her vehicle, and either places the bags into the trunk or in the back of the car or van, it is very likely that such highly flexible bags simply fall over, either depositing their groceries all over the back of the vehicle, or such will most certainly happen when the vehicle is in movement, and particularly when driving around corners, and the like. Hence while such bags are convenient for personal carrying, they become detrimental for sustaining the goods, particularly when emplaced within the vehicle.

It is not known what type of means has previously been provided for overcoming the foregoing, problem, and one has not seen any type of instrumentation provided for remedying the matter of concern. But, the improvements as defined herein are designed to remedy such predicaments, particularly with respect to transfer of multiple bagged merchandise within the vehicle.

SUMMARY OF THE INVENTION

It is the principal object of this invention to provide a system for sustaining bags of merchandise temporarily stored within a vehicle during transit, keep them upright, provide readily accessible handles to facilitate their gripping by the shopper, after such bags have been conveniently suspended upon the system of this invention.

This invention contemplates the formation of structure that can be conveniently mounted within some segment of the vehicle, whether it be within the trunk, adjacent the back of the rear seat of a minivan, or at any other convenient location where the system of this invention may be installed, to provide organization to the temporary storage and suspension of grocery or other goods laden shopping bags, during transit.

One embodiment of the invention discloses the bag handling system of this invention mounted upon the interior underside of the trunk lid of a vehicle, is conveniently structurally mounted at least at two locations reasonably adjacent and contiguous with the underside of the trunk lid, while the various support arms that are slide mounted onto the system readily expose their integral hooks upon which the handles of plastic shopping bags may be applied, vertically orienting the laden bags within the trunk, so that when the trunk lid is closed, the bags will sustain an upright position, retain their merchandise therein, and be conveniently available within easy access to the shopper, once he/she arrives at home, reopens the trunk lid, in preparation for removal and carrying of the bags into the residence.

A second embodiment of this invention provides a conveniently disposed bag handling system that mounts directly to the backside of, preferably, the rear seat of a minivan, or the like, which during nonuse, can be conveniently pivoted into a generally flush location contiguous against the back of a seat, so as to be compactly stored, providing ample space for locating of other items upon the van floor, but during usage and application, the support arms of the system may be collectively pivoted upwardly, approximately a 90° angle, supported by a support rod, and readily facilitate the application of the handles of plastic or paper carrying bags thereto, for conveyance to the home.

In an alternative embodiment, directly related to the bag handling system as just previously summarized as used in conjunction with the rear or other seat of a minivan, it is just as likely that the support arms may pivot downwardly, with the system incorporating stop means to maintain the level of the support arms, when in use, in an approximate horizontal position, to conveniently provide their integral hooks at a position for reception of the handles of said plastic bags, and sustain said bags in an upright position, during conveyance.

As a further modification to this invention the bag handling system can also have greater portability to it, and its various components may be suspended, for example, over the back seat of a van, to dispose the system, when erected, in a position that conveniently can have bags applied to it, and suspended for a short distance, downwardly towards the vehicle floor. In a further alternative, the means for suspending the bag handling system can be permanently affixed to the back of the vehicle seat. It is just as likely that the bag handling system can be of an abbreviated style, and be either permanently affixed to, or suspended by hooks over the back seat, of a vehicle, van, or the like.

Furthermore, it is likely that the support arms for this invention, and which normally dispose the various bag grasping means, can be affixed permanently to the interior of the trunk of a vehicle, which places them conveniently out of the way during normal usage of the vehicle trunk for storing other items, but at the same time, disposes the arms rather conveniently for securement of the handles of any bags or other containers thereto, when there is need for application of the bag handling system of this invention.

These are example as to how the system of this invention can be conveniently mounted, even after the vehicle has been long purchased, by the owner himself/herself, to provide an organizing means for facilitating the conveyance of merchandise laden plastic or other bags, during transit.

The system of this invention is designed to control plastic and other handled bags, of the type commonly used by grocery stores and other retailers, during transport within an automobile, or other type vehicle. Quite simply put, the system prevents bags from falling over and spilling their contents in an automobile trunk or at the back of a van, the latter of which can cause merchandise, particularly canned goods, to roll in all directions, making it an extremely difficult and frustrating task for the homemaker to retrieve the same, upon arriving at the residence. This system is accomplished by hanging the bags from various integral trigger hooks or integral hooks that are incorporated into the simple design of this system. The system is designed to keep the bags in an upright or hanging position, during transport, and to prevent them from overturning during normal driving.

The functionality of this system is not only to provide convenient support for grocery bags, or a number of the same during application, but it can also incorporate a variety of other available accessory item supporting structures. For example, an emergency road-side assistance kit, in addition to a road-side tool kit, are but just two of the other types of items that may be supported by modifications to the system of this invention, and which can be designed to work in conjunction with the system without diminishing the central feature of its advantages, and that is to furnish bag-handling control, during movement. Anything that is capable of being hanged, or bagged, the latter with a handle, can be better transported and more conveniently handled by the system of this invention. It is just as likely that suit bags, dry-cleaning bags, and shopping bags are just a few of the additional type of applicable items that can be transported more conveniently by the bag handling system of this invention.

The bag handling system of this invention accomplishes even more than simply keeping groceries in their place, and sustains them in their storage bags during transit. It provides more interior passenger room for those people who must shop with others, namely, the children. It prevents the same children from getting into the products while riding, since the prior art shopping bags usually are located anywhere upon the floor of a vehicle, where any free space can be found, normally at the feet of the child, or adjacent the child on the seat, which encourages the child simply to begin to explore, pulling merchandise out of the bags, and depositing such at any convenient nearby location. This can be a source of friction to the driver, while trying to maneuver the vehicle upon the road, while at the same time cautioning the child against tampering with the merchandise. Furthermore, the system of this invention prevents unexpected spills, either from the child tampering, or from the automobile cornering. It assists in keeping the interior of the vehicle clean, and reduces wear to its interior, and it also reduces the risk of break-in by keeping the contents of the shopping bags out of sight. Finally, it assists in keeping the items you purchase from being soiled, or intermixing with other undesirable merchandise, such as dirty tools, and the like upon the floor of the trunk. This is achieved by furnishing the hanging concept for the bags, upon the trunk lid, or other structure, through usage of the system of this invention.

The bag handling system of this invention, in usage, is one of simplicity. The integral hooks or trigger-hook hanger bars lift up each time the trunk lid is lifted, exposing the hooks for easy hanging of bags. The trunk support struts are neatly out of place until needed, and snap-lock into the back of the attachment rods or structural supports. Upon opening the trunk, all that needs to be done is to pull down the support strut assembly, and rest it on the trunk opening, and then hang the bags onto the integral hooks, and when that if fully completed, disengage the support strut and simply close the trunk lid. Upon arriving at a destination, one may simply open the trunk, the bags will lift up with the trunk lid upon its pivoting open, and then disengage the support strut for resting it upon the trunk floor, to maintain the bag laden trunk lid elevated, at a convenient level to the grasp of the driver.

The bag handling system of this invention is preferably constructed of a high strength polymer or metal, such as that used in the manufacture of automotive accessories, such as ice scrapers, or other components of the vehicle. There are only two basic components to this system, the base attachment strips or structural supports, and the integral hook support bars. The use of various attachment means or fasteners for the support struts can affix the system into place, particularly when used interiorly of a trunk, and any type of snap-lock fasteners, screws, or the like, can provide for that type of connection. The support strut unit may be made of high tensile, durable steel, similar to that as used to hold a vehicle hood elevated, and has sufficient strength to provide for maintaining the trunk lid opened, even when a plurality of shopping bags have been affixed to the system. The system is simply mounted under the vehicle trunk lid, as previously described, using a variety of the type of fastening hardware as explained, or in the alternative, similar type fasteners may be used for securing the system to the back of a van seat, to secure the system in place, and ready for usage.

It is therefore, the principal object of this invention to provide a bag handling system designed for use in vehicles, and which can conveniently support a variety of handled bags, of the plastic or paper type, all laden with frequently heavy merchandise, to conveniently provide for their shipment, without scattering about the vehicle floor.

Another object of this invention is to provide a bag handling system that can be fully supported and elevated for usage,. or it may be self-supporting depending upon the modification to the system applied.

Still another object of this invention is to provide a bag handling system that may be quickly and facilely secured to vehicle structure with a minimum of effort.

Yet another object of this invention is to provide a system for supporting merchandise laden bags, with the support arms for the system being very convenient and within reach of the vehicle owner, to facilitate the application and disengagement of merchandise laden bags.

Yet another object of this invention may be to provide the fabrication of at least the support arms for this invention of a fluorescent orange plastic, so as to provide a form of cautionary warning for the safety of the vehicle owner, when the trunk lid is opened, such as when replacing a flattened tire, adjacent the roadway.

These and other objects may become more apparent to those skilled in the art upon reviewing the summary herein, and upon undertaking a study of the description of the preferred embodiment as set forth.

BRIEF DESCRIPTION OF THE DRAWINGS

In referring to the drawings,

FIG. 4 is an underside view of a modified type of handling system of this invention, of the type for use for holding directly, other merchandise, such as lubricant oil container, first aid kit, tool box, or the like;

FIG. 5 is a partial side view of the interconnection between an end of the support arm secured on and supported by the support strut of the system;

FIG. 6 is a modified view of the bag handling system of this invention, shown mounted to the back of the rear seat of a minivan, or the like;

DESCRIPTION OF THE PREFERRED EMBODIMENT

Figure 1:
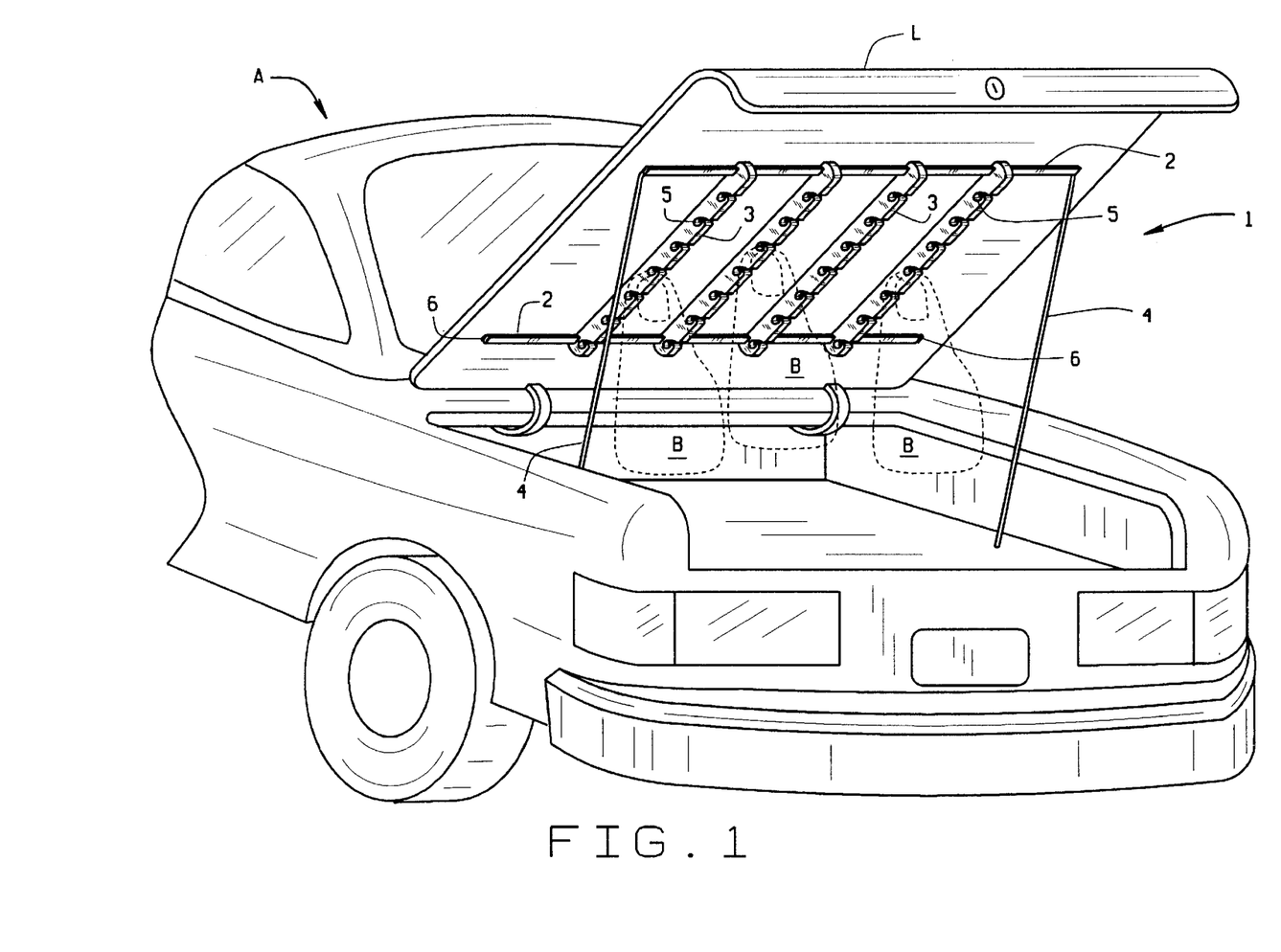
FIG. 1 is an isometric view of the partial vehicle, showing its trunk opened, and displaying the bag handling system of this invention during usage.

In referring to FIG. 1 of the drawings, therein is shown partially an automobile A disclosing its trunk lid opened, and showing mounting to the interior of the trunk lid the bag handling system 1 of this invention. As disclosed, it shows a pair of support struts 2 that are fastened securely by means of screws, clips, or other fastening means to the structure of the trunk, with the spaced struts being located at a distance apart to provide for the convenient mounting thereon of a plurality of support arms 3 as noted. The ends of the upper strut 2 have hingedly connected therewith a support rod 4, which pivots downwardly for engaging against the bottom of the trunk, in order to sustain the lid, and the bag handling system of this invention, in an upright position, even when a variety of merchandise laden bags, as at B, are suspended therefrom. As can be noted, the handles of the bags engage within integrally formed hook means, or trigger hooks 5, and as can be readily seen, a large number of the bags can be conveniently supported upon the plurality of hook means 5, during usage of this system. It can also be noted at the end of the lower support strut 2 there is provided a resilient clip, such as the spring clips 6, so that when the system is not in use, or when the system has been laden with a plurality of bags B, the support rods 4 can be pivoted upwardly, and resiliently clipped within the members 6, so the trunk lid can be closed, with said rods 4 being conveniently arranged adjacent the underside of the trunk lid, during their non-usage.

Figures 2, 3:
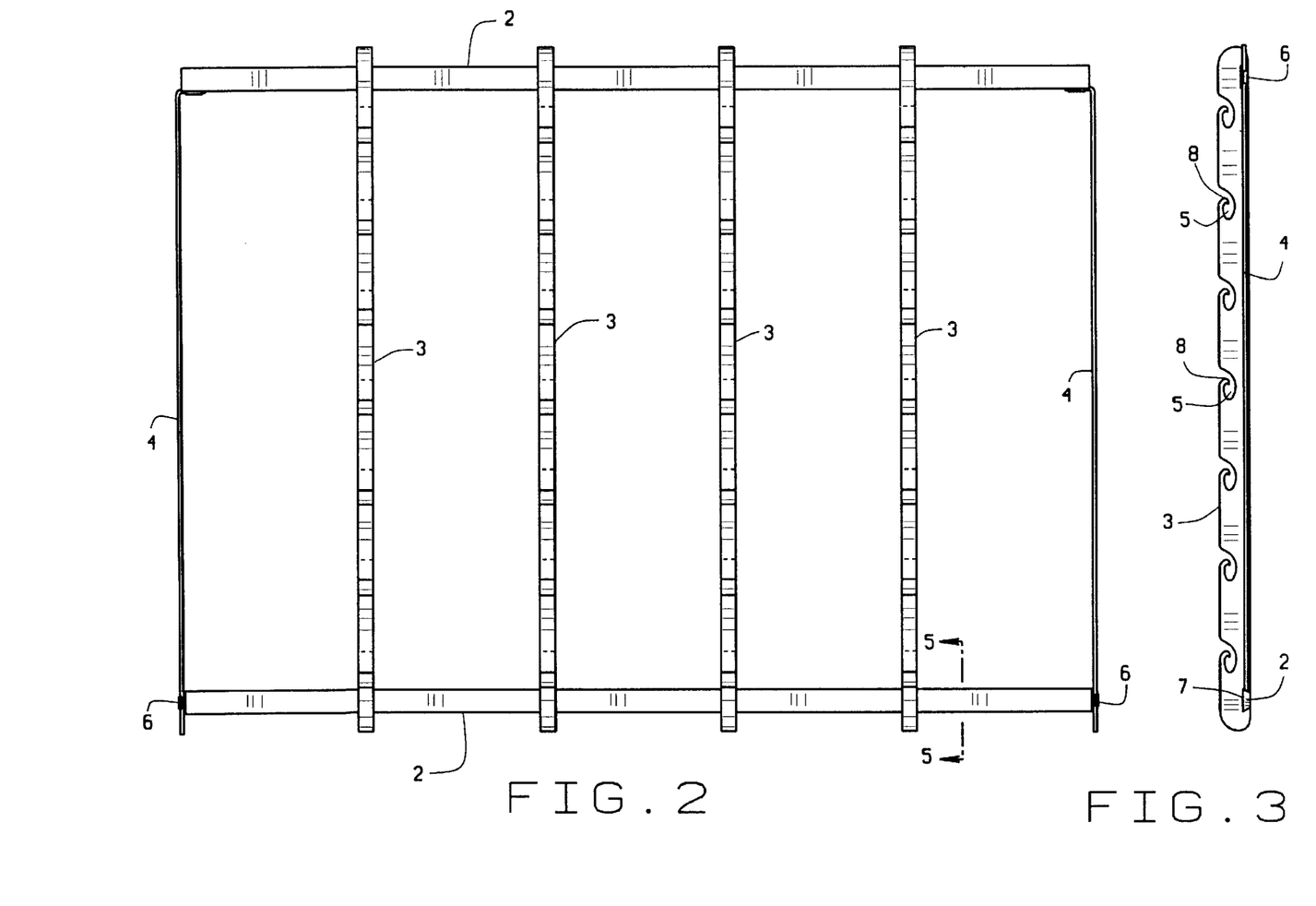
FIG. 2 is an underside view of the bag handling system of this invention, as shown in FIG. 1.
FIG. 3 is a side view of a support arm, showing its support rod arranged adjacent thereto, as viewed from the right side of the drawing of FIG. 2.

As can be seen in FIGS. 2 and 3, the support struts 2 have ample width, just short of the length of the trunk lid L, as noted, and a variety of the support arms 3 can be mounted thereon, in a manner as to be described. As noted in FIG. 3, the support struts 2, the upper one being concealed behind the rod 4 and its fastening clip 6, are fabricated, in cross-section, of a truncated configuration, to provide greater strength to these members. In addition, each support arm 3 includes a corresponding cut groove, across its width, and which is likewise designed of a truncated shape, as can be seen at 7, so that the support arms, at their truncated cut-outs 7, can be conveniently slid onto the support strut 2, and readily supported in place. Any number of support arms can be slid onto the struts 2, as may be convenient for the user, and while four are shown, it is just as likely that more might be applied, or less, depending upon the needs of the system's application.

As can be clearly seen in FIG. 3, the hook means or trigger hooks 5 are integrated molded, preferably of a plastic, to provide an integral hook, as noted, and which are generally facing rearwardly, within the configuration of their assembly and securement to the interior of the trunk lid, so that any plastic or other bag handles looped onto a hook means, will be held in position, even when the trunk lid is closed, primarily due to the upturned feature 8, of each hook when installed.

Figures 4, 5:
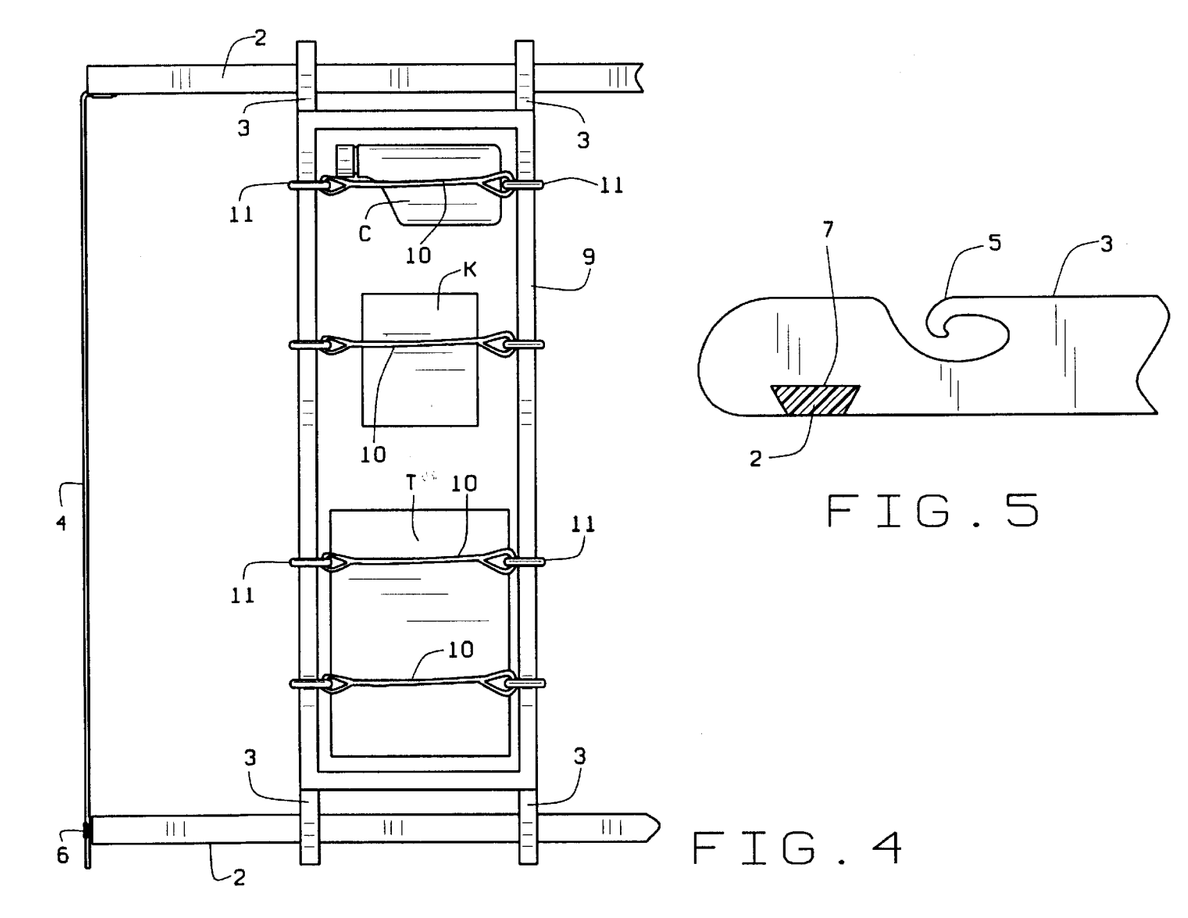

The particular configuration of the truncated shape made of the support strut 2, the truncated cut-out portion 7 of the support arm, in addition to the configuration of the hook means 5 can be readily seen in FIG. 5.

A modification to the structure and application of the system of this invention can be seen in FIG. 4. As noted, a pair of support arms 3 may connect in the usual fashion to their struts 2, as previously explained. When in that position, a base plate 9 may secure with the support arms 3, and this base plate may be fabricated of a polymer, to provide design formed cavities therein, and into which various items may be stored, such as the lubricating oil container C, as noted, a first-aid kit K, as can be seen, or even a tool box T, as noted. As can also be seen, convenient elastic cords, as at 10, can be linked or interconnected, by means of the fasteners 11, to the support arms 3, and furnish the means for holding these additional accessory items in place, even when suspended inverted, as when the trunk lid is closed. This is just an example of the versatility of the merchandise handling system of this invention, which can be conveniently used for holding bags in place, or other items, as explained. Furthermore, as can be understood upon viewing FIG. 4, other support arms 3 may be located in place, exposing their hook means 5 conveniently downwardly, for holding a variety of bags in place, adjacent the accessory storage means as shown and described previously in this FIG. 4.

Figure 8:
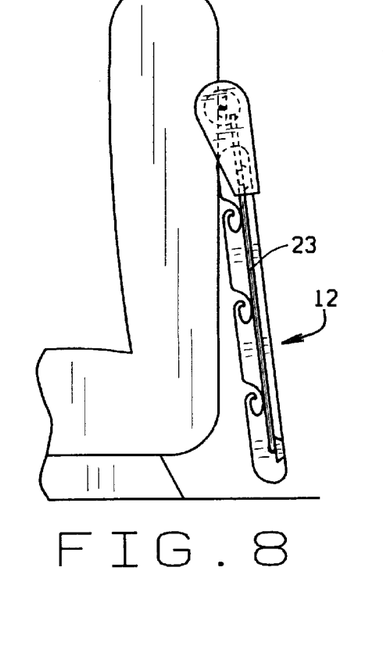
FIG. 8 shows the system of FIG. 6 when not in use, and pivoted downwardly into its storage position.
Figure 9:
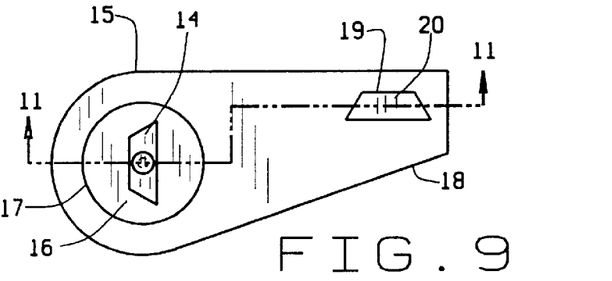
FIG. 9 is an interior side view of a hinge assembly of the system.
Figure 10:
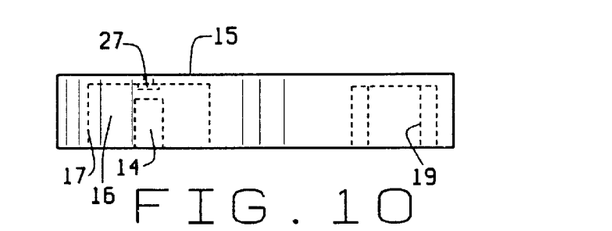
FIG. 10 is a top view of the hinge assembly of FIG. 9.

A modification to the application and usage of the system of this invention is further disclosed in FIGS. 6 through 11. As can be seen, the bag handling system 12 shown herein is designed for connecting directly to the back, preferably of the rear seat of a vehicle, such as a minivan, or the like, and yet furnish the same attributes for temporary storage of bagged merchandise, during usage. As can be seen, a fastening bar 13 connects directly to the back of the seat, being secured thereto by any type of fastening means that interconnect with the reinforcement provided normally within the structure of such a vehicle seat S. As can be seen in FIG. 9, this bar 13 may likewise be fabricated of a truncated design, as noted at 14, and at its ends it extends slightly beyond the side edges of the shown seat, to provide for the interconnection therewith of the pivotal hinge assembly 15 as noted. Any type of fastener may retain these two components together, once the fastening bar 13 is slide mounted to the hinge assembly. The hinge assembly, as can be seen, includes a circular component 16, which is mounted with the formed cavity 17 provided in the hinge assembly. Thus, the hinge assembly 15 is free to pivot with respect to the stationary fastening bar 13, as it connects to the circular disc portion 16 of the hinge assembly. The hinge assembly 15 tapers at its outer extension, as at 18, where it includes a routed or molded section 19, which is of truncated configuration, for supporting therein and holding firmly thereto another structural support or strut 20 of the bag support system. This strut 20, in addition to its corresponding outer support strut 21, is designed in the same manner as the previously described struts 2, and is designed for intermating with the support arms 22 for providing the bag supporting system of this invention. Once again, a support rod 23 hingedly connects, as at 24, with the left side support arm 22, and is designed for extending downwardly, to maintain the system at a near horizontal position, when set up for supporting a variety of merchandise laden bags, during transit. But, when the system is not being used, the rod 23 may be pivoted upwardly, and secured within its resilient clip 25, such that when this occurs, the entire system may be pivoted downwardly, as disclosed in FIG. 8, conveniently out of the way during storage and nonusage. The installation, when assembled for usage, can be seen in FIG. 7. And, since it does have a slight downward slope to its support arms 22, their integral hook means 26 are directed forwardly, in order to assure that the handles of any bags applied thereon, will remain intact, and not slide free, during movement and travel of the associated vehicle.

Figure 11:
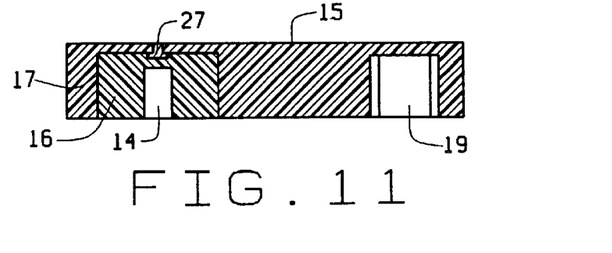
FIG. 11 is a sectional view taken along the line 11—11 of FIG. 9.

As can also be seen in FIG. 11, the circular disc 16 may be secured within the hinge assembly cavity 17 by means of a fastener, as at 27, to secure it in place, and free to allow pivot of the associated assembly 15, during pivot of the system between its application and nonuse when applied.

Figure 12:
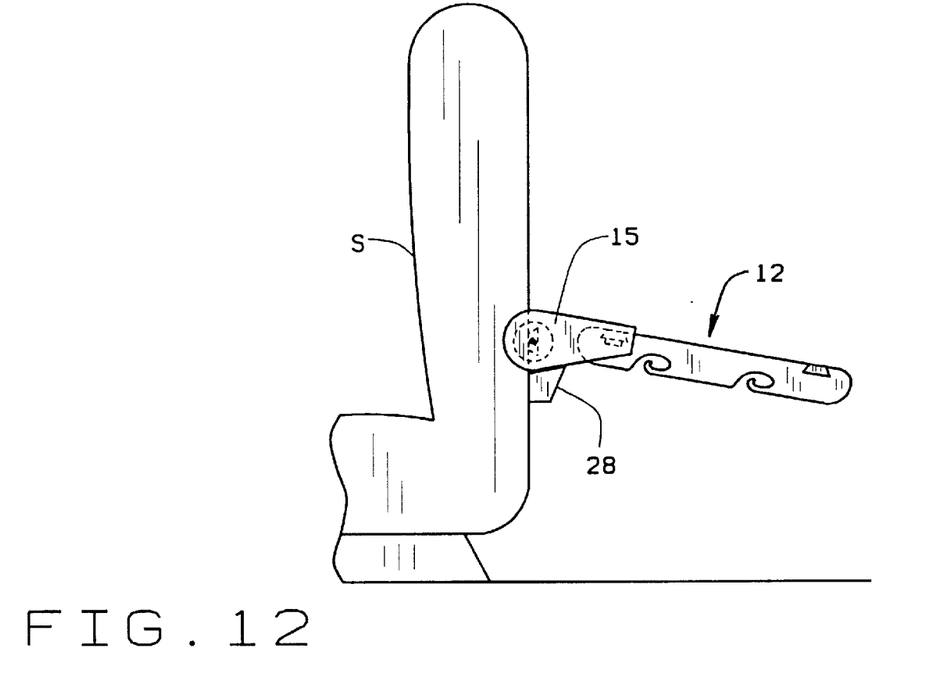
FIG. 12 is a side view of a modification to bag handling system of FIG. 6, showing how it connects to the midpoint or lower section of the back of the rear seat, and folds downwardly into a near horizontal position as during usage.
Figure 13:
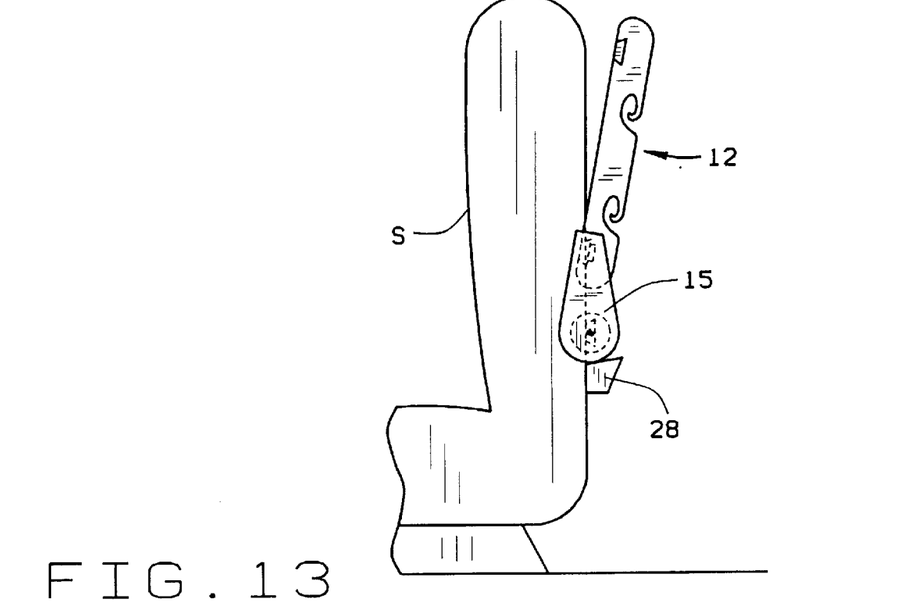
FIG. 13 discloses how the modified system of FIG. 12 pivots upwardly into storage, as when not in use.

A slight modification to the bag handling system of this invention, where instead of pivoting downwardly, during nonusage, as disclosed in FIG. 8, it may pivot upwardly, as shown in FIGS. 12 and 13. As can be seen, the bag handling system 12 as interconnected with its hinge assembly 15 is arranged at a lower position transversely of the back of the rear seat S. In this position, the system is designed for pivoting downwardy, during usage, whereby a stop means 28 is encountered, and sustains the location of the system at a near horizontal, as shown. Obviously, a related type of fastening bar 13 is applied to the back of the seat, at this location, to secure the hinge assemblies 15 in place. When the system is not in use, it may be simply pivoted upwardly, in the manner as shown in FIG. 13, to be arranged adjacent the back contiguously against the seat, out of the way, for convenient storage during nonusage. This is an example of the versatility of the bag handling system of this invention, or the accessory mounting development as provided and explained herein, and how it may be rapidly and facilely applied, within the vehicle, to provide multiple securement of various items thereto, during usage, but readily pivoted or located out of the way, during periods of in application.

Figure 14:
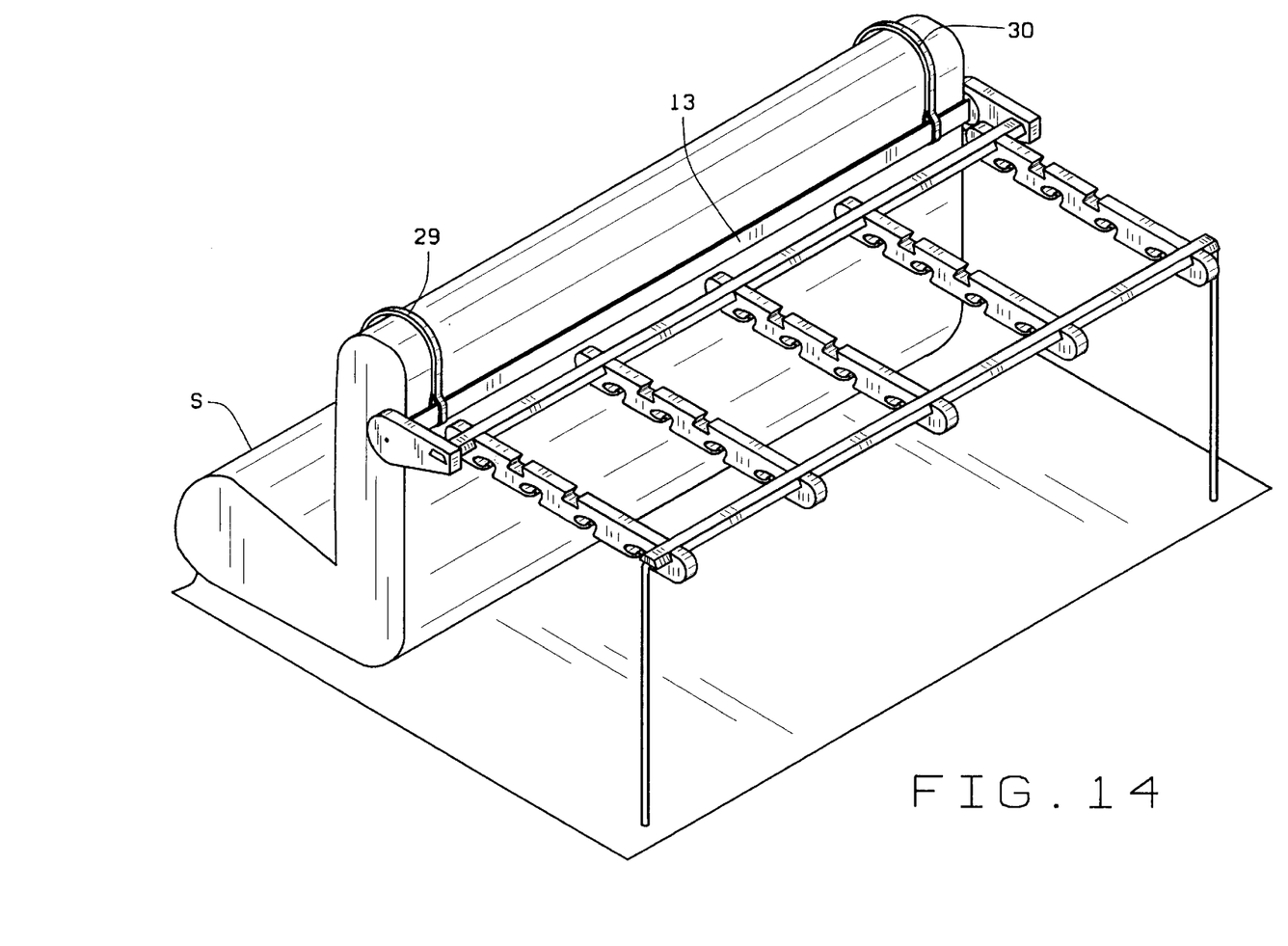
FIG. 14 discloses the application of the bag handling system of this invention through the usage of hook means that suspend over the back seat of the vehicle or van.

FIG. 14 discloses a bag handling system of a similar configuration to that as shown and described previously in FIG. 6. On the other hand, in this modified embodiment, as shown in FIG. 14, the fastening bar 13 that spans laterally across the back of the van seat S is secured to a pair of seat suspension hooks 29 and 30, as can be noted, and which drape over the upper edge of the shown seat, and thereby suspend the proximate end of the bag handling system, as can be noted, for easy installation, but yet the system can be immediately removed, and stored elsewhere, or laid on the floor, as when not in use. In addition, it is likely that the bags suspension system may be sufficiently narrow, so that it may slide directly under the seat, for easy storage, as when not in use.

Figure 6:
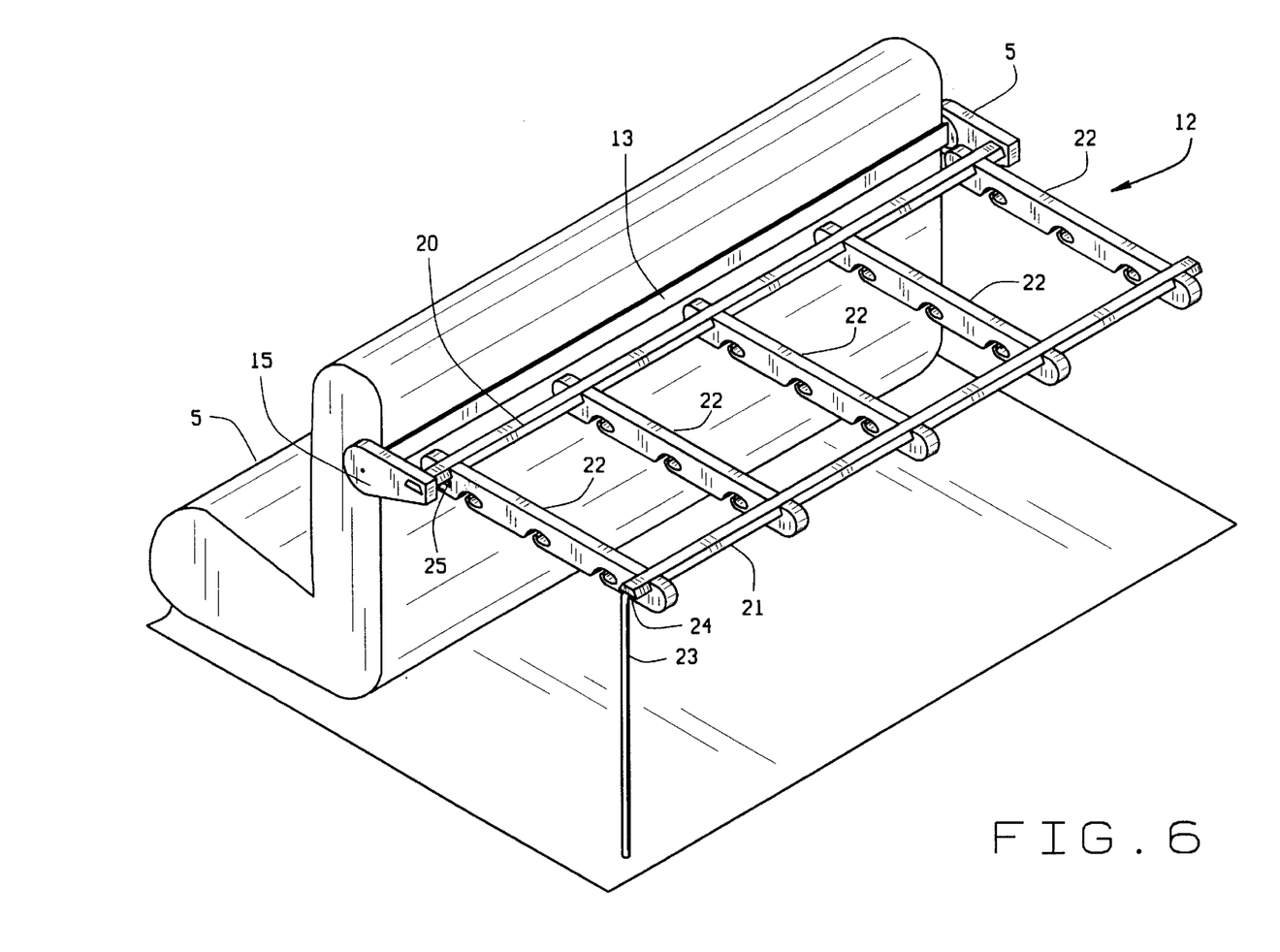
Figure 7:
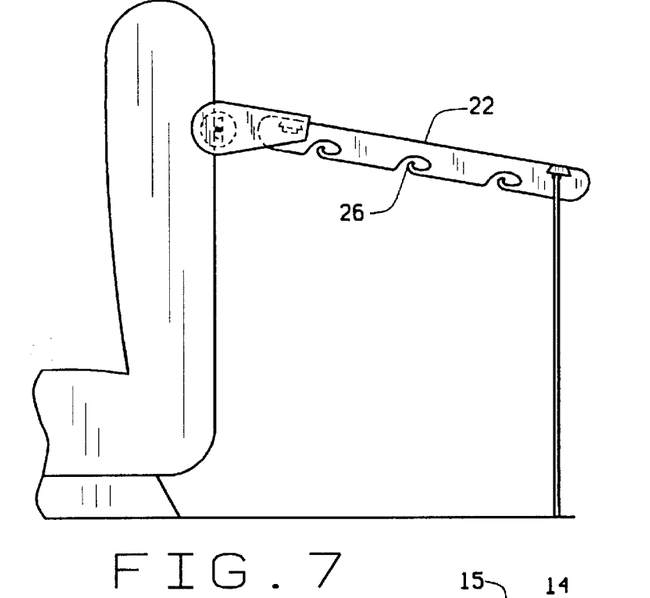
FIG. 7 is a left side view of the system of FIG. 6.
Figure 15:
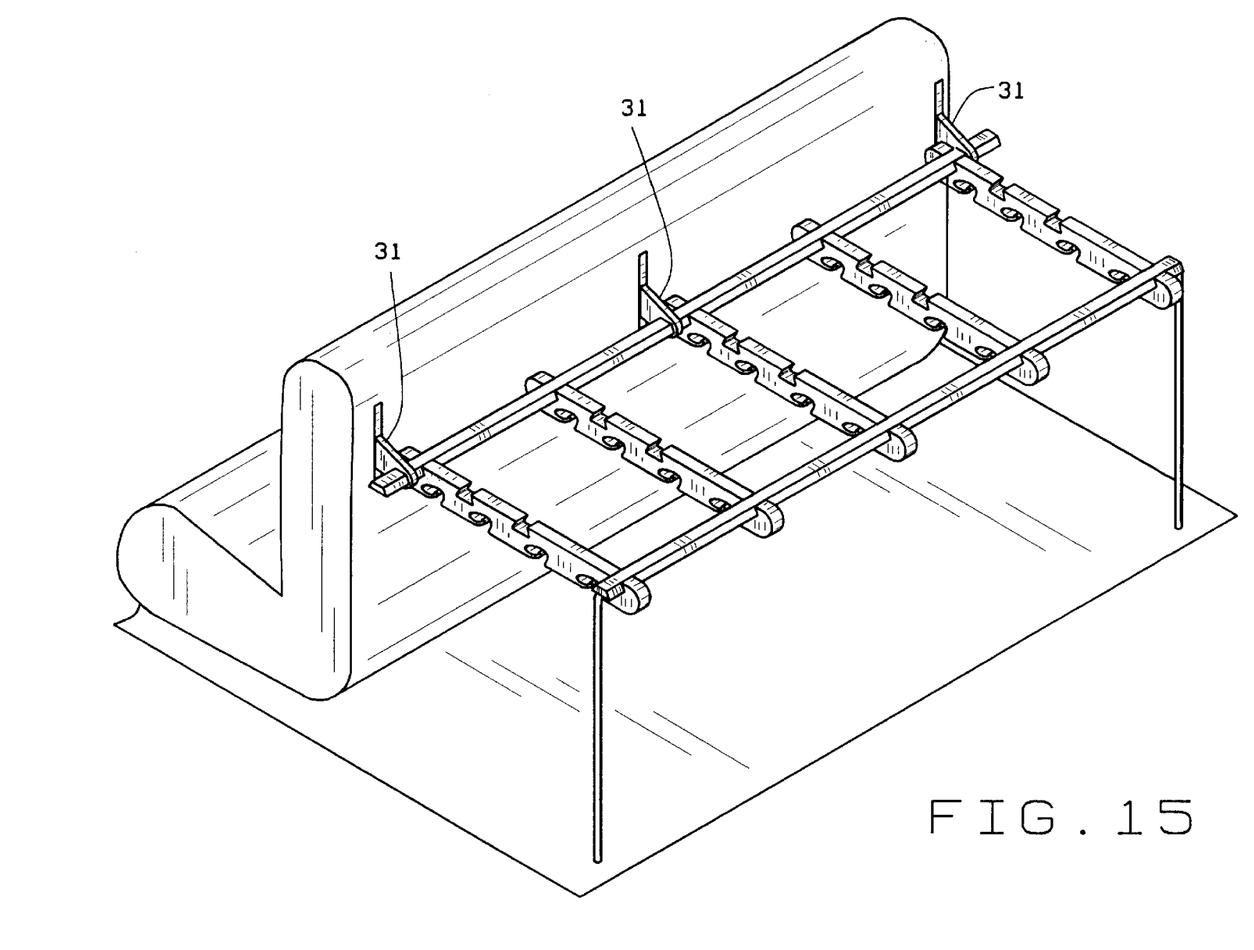
FIG. 15 discloses the suspension means as comprising its supports being permanently affixed to the back-seat liner of the vehicle.

The bag handling system shown in FIG. 15 is also related to that as previously described with respect to the system as disclosed in FIG. 6. In this particular instance, the system is suspended by permanently affixed links 31, which secure directly internally to the seat-back liner, or its integral structure, to provide for a permanent installation, directly to the seat structure, when installed.

Figure 16:
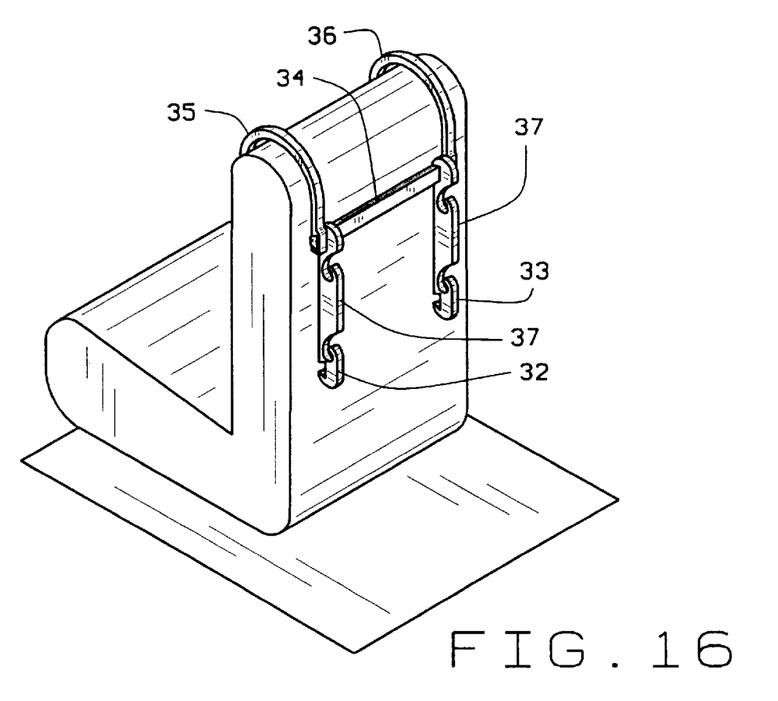
FIG. 16 shows an abbreviated style of seat hook form of temporary application of the bag handling system to the back seat of the van.

FIG. 16 discloses an abbreviated form of the invention as previously described with respect to the invention as explained in FIG. 14. In this particular instance, the suspension system comprises a pair of the support arms 32 and 33, more or less, which are held to the fastening bar 34, as noted. Then, the fastening bar is secured to the seat hooks 35 and 36, which drape over the upper edge of the back seat of the vehicle, and suspend downwardly, for securement of the fastening arms thereto. In this condition, the device can be connected directly to a single width seat, and furnish at least four integral hook means, as at 37, and as can be seen.

Figure 17:
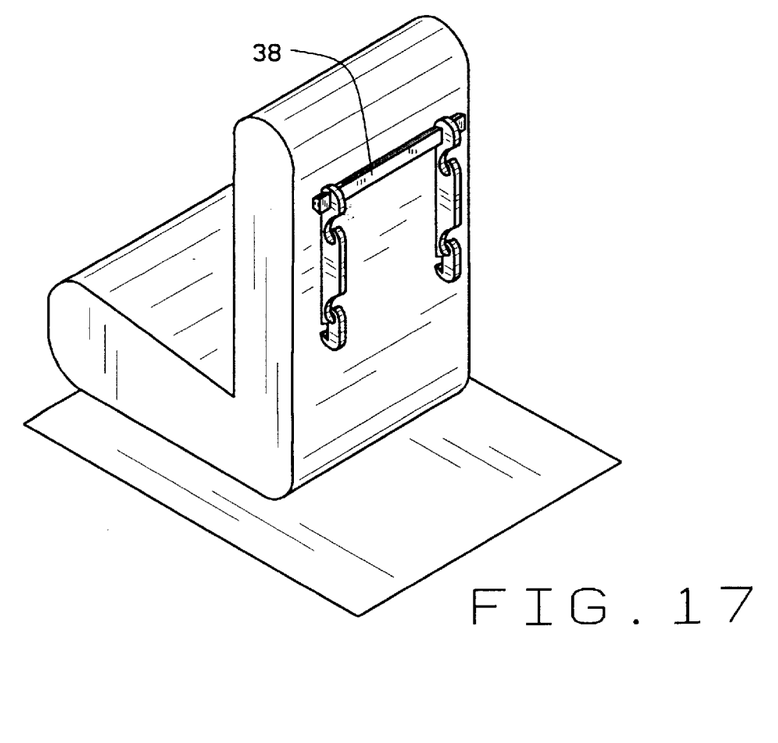
FIG. 17 shows how the abbreviated style of bag handling system can be permanently installed to the back of the seat of the van.

The bag suspension system as shown in FIG. 17 is related to what was previously described with respect to the invention as disclosed in FIG. 16, but in this particular instance, the fastening bar 3 8 is rigidly secured into the seat-back liner, or directly to its integral structure, to provide for a more permanent mount of the system in place, and readily available for usage, as desired. And, as can be seen, since the bag handling system is mounted flush against the back of the seat, it is normally out of the way, and does not protrude into any usable space, at the back of the van, when the bag handling system is not being utilized.

Figure 18:
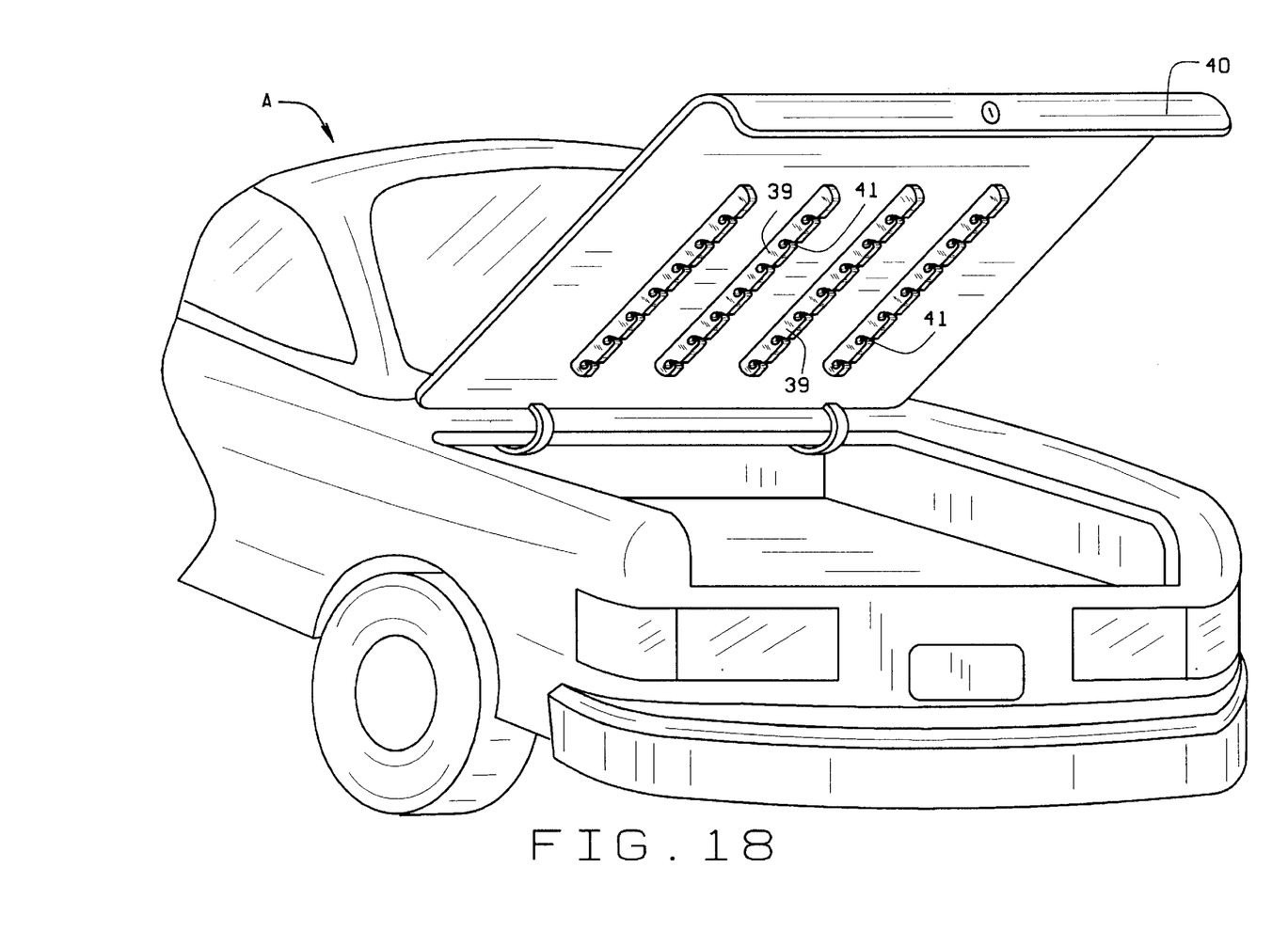
FIG. 18 discloses how the support arms are permanently installed to the interior surface of the trunk lid of the vehicle.

A final embodiment for this invention is shown in FIG. 18. In this installation, it is related to the bag handling system as previously described with respect to the invention of FIG. 1. As disclosed, in this particular instance, the support arms 39 are rigidly fastened directly to the interior structure of the trunk lid 40, as noted, and once again, this provides their shown hooks 41 readily available for installation of bags thereto, by way of their handles, when the support means is needed. But, when the bags are removed, and the bag handling system is not utilized, these support arms 3 are clearly out of the way, and do not interfere with the normal storage usage of the vehicle trunk, when used for that purpose.

Variations or modifications to the structure and function of this system may occur to those skilled in the art upon reviewing the invention as described herein. Such variations or modifications are intended to be encompassed within the scope of the invention as shown and explained. The description of the preferred embodiment, as shown in the drawings, is set forth for illustrative purposes only.

What is claimed is:

1. In combination with a vehicle having a back seat, a bag and accessory handling system for use for connection to the back seat of the vehicle, and provided for suspending a handled bag or other accessory from the handling system, said handling system comprising struts, one of said struts capable of being supported by the back seat of the vehicle, said struts comprising a pair of support struts, said pair of support struts being arranged parallel and spaced apart, a series of support arms being parallel arranged and securing perpendicularly proximate their ends to said support struts, said support arms having shaped grooves therein, and said support struts being correspondingly shaped to provide for their complemental fitting within the shaped arm grooves so as to allow the support arms to adjustably slide onto said pair of support struts and be maneuvered into a usable position thereon, said support arms having hooks formed thereon for suspending a bag or other accessory therefrom, a pair of suspension hooks, at least one of said support struts secured by said suspension hooks to the back of the back seat of the vehicle, and said hooks of the support arms provided for supporting bags or other accessories from the handling system during usage.

2. In a vehicle having a trunk, and said trunk incorporating a trunk lid, a bag and accessory handling system for use within the trunk of the vehicle and for mounting to the vehicle trunk lid, and said accessory handling system provided for suspending a handled bag or other accessory therefrom, the handling system comprising a pair of struts disposed for securement to the trunk lid inside the vehicle trunk, said struts comprising a pair of support struts, said pair of support struts arranged parallel and spaced apart, said pair of support struts being rigidly fixed to the trunk lid, a series of support arms parallel arranged and secured perpendicularly proximate their ends to the pair of support struts, said support arms having shaped grooves therein, and said support struts being shaped to provide for their complemental fitting within the shaped support arm grooves so as to allow the support arms to adjustably slide onto said pair of support struts and be adjusted into a usable position upon said support struts, said support arms having fastening means formed thereon and for suspending a bag or other accessory therefrom, the fastening means of the support arms comprising integral hooks, said hooks exposed within the handling system, for supporting bags or other accessories suspended from the handling system during usage, there being spacing provided between adjacent support arms, said spacing accommodating positioning of accessories therein, an elastic means securing to the fastening means of each adjusted support arm, and provided for holding any accessory disposed between said support arms during storage, a base plate, said base plate, arranged between said support arms, and provided for holding accessories thereto during storage.

3. In combination with a vehicle back seat, said back seat having a back thereof, a bag and accessory handling system for use for connection to said back seat of the vehicle, the accessory handling system provided for suspending a handled bag or other accessory from the handling system, said handling system comprising struts, said struts capable of being supported by the back seat of the vehicle, said struts comprising a pair of support struts, said pair of support struts being arranged parallel and spaced apart, a series of support arms being parallel arranged and securing perpendicularly to said support struts, said support arms having shaped grooves therein, said support struts being shaped to provide for their complemental fitting within the support arms shaped grooves so as to allow the support arms to adjustably slide onto said pair of support struts and be maneuvered into a usable position thereon, said support arms having fastening means formed thereon and suspending a bag or other accessory therefrom during handling system usage, and means for supporting the handling system on the back seat of the vehicle, and said means including a fastening bar, said fastening bar securing to the back of the vehicle back seat, a hinge assembly provided proximate each end of one of said support struts, and said hinge assemblies connecting said support struts and the support arms to the fastening bar, wherein said fastening means formed upon the support arms comprising hooks, said hooks exposed downwardly within the handling system, and provided for supporting handled bags or other accessories suspended from the handling system during usage.

4. The system of claim 3 wherein said support arms and struts pivot into proximity with the back of the vehicle seat when not in use.

5. The system of claim 4 wherein said support arms and struts pivot substantially into a horizontal position extending from the back of the vehicle seat when installed for usage.

6. The system of claim 5 and including a support rod, said support rod pivotally connecting to one end of one of said support struts, said support rod holding said support arms and support struts into a substantially horizontal and level position with respect to the back seat of the vehicle when set up for usage.

7. The system of claim 6 and including a second support rod, said second support rod attaching to the other end of said support strut to support said support struts and support arms approximately level and horizontally arranged when pivoted and set up for usage.

8. The system of claim 3 wherein said fastening bar and support struts being polygonal in cross section, said support struts fitting into said support arms, said support arms having polygonally shaped grooves therein and provided for accommodating insertion of the support struts therein, said hinge assemblies having polygonal shaped grooves provided therein, and said fastening bar securing therein.

9. The system of claim 3 wherein said polygonal shaped grooves being a truncated triangle in shape, and said fastening bar and support struts being a truncated triangle in shape.

* * * * *